(12) United States Patent
Kam

(10) Patent No.: US 6,290,624 B1
(45) Date of Patent: Sep. 18, 2001

(54) CENTER DIFFERENTIAL FOR 4-WHEEL DRIVE VEHICLE

(75) Inventor: Jeong-Heon Kam, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/473,423

(22) Filed: Dec. 28, 1999

(30) Foreign Application Priority Data

Sep. 22, 1999 (KR) .................................................. 99-41046

(51) Int. Cl.[7] .............................. F16H 48/06; F16H 57/08
(52) U.S. Cl. ............................................. 475/251; 475/336
(58) Field of Search ................................. 475/248, 251, 475/252, 331, 334, 336, 342, 344

(56) References Cited

U.S. PATENT DOCUMENTS

| | | | |
|---|---|---|---|
| 1,297,954 | * | 3/1919 | Williams ........................... 475/251 X |
| 5,108,353 | * | 4/1992 | Brewer et al. .................. 475/251 X |
| 5,242,336 | * | 9/1993 | Hori .................................. 475/251 X |
| 5,385,514 | * | 1/1995 | Dawe .................................. 475/336 |
| 5,433,673 | * | 7/1995 | Cilano ................................ 475/252 |
| 5,443,431 | * | 8/1995 | Cilano ............................ 475/252 X |
| 5,669,844 | * | 9/1997 | Homan et al. ................. 475/252 X |
| 5,730,679 | * | 3/1998 | Ichiki ................................. 475/252 |
| 5,910,066 | * | 6/1999 | Schulz et al. ....................... 475/336 |
| 6,059,683 | * | 5/2000 | Teraoka et al. ................ 475/252 X |

FOREIGN PATENT DOCUMENTS

| | | | |
|---|---|---|---|
| 0920636 | * | 4/1947 | (FR) ..................................... 475/336 |
| 257825 | * | 4/1949 | (FR) ..................................... 475/336 |

* cited by examiner

*Primary Examiner*—Rodney H. Bonck
*Assistant Examiner*—Roger Pang
(74) *Attorney, Agent, or Firm*—Christie, Parker & Hale, LLP

(57) ABSTRACT

A center differential for a four-wheel drive vehicle includes a differential case having a longitudinal axis, front and rear side gears disposed within the differential case in a longitudinal direction, and a plurality of pinion gears engaged with the outer circumferences of the front and rear side gears. Each rotating axis of the pinion gears is declined at a predetermined angle with respect to the longitudinal axis of the differential case.

2 Claims, 4 Drawing Sheets

CENTER DIFFERENTIAL FOR 4-WHEEL DRIVE VEHICLE

FIELD OF THE INVENTION

The present invention relates to a 4-wheel drive vehicle, and more particularly, to a center differential for a 4-wheel drive vehicle that differently distributes drive torque to front and rear wheels while functioning as a limited slip differential.

BACKGROUND OF THE INVENTION

FIGS. 3 and 4 show a conventional center differential used in a 4-wheel drive vehicle. The terms "front" and "rear" as used herein shall mean and refer to the respective forward and rearward directions of the vehicle body.

As shown in the drawings, a ring gear 51 is disposed around a differential case 52 and connected to a drive pinion (not shown). Front and rear side gears 53 and 54 are disposed within the differential case 52 and are splined to a drive shaft (not shown). The side gears 53 and 54 are provided with helical gear teeth 55 at their outer surfaces.

Four sets of pinion gear assemblies 57 each having first and second pinion gears 60 and 61 are disposed within gear grooves 56 formed on an inner wall of the differential case 52 and are engaged with the side gears 53 and 54. The first pinion gear 60 has long and short helical gears 58 and 59 disposed along a common axis, and the second pinion gear 61 has long and short helical gears 63 and 62 disposed along a common axis. The first and second pinion gears 60 and 61 of each set of pinion gear assemblies 57 are disposed such that the long and short helical gears 58 and 59 mesh with the short and long helical gears 62 and 63 of the second pinion gear 61, respectively. In addition, the long helical gears 58 and 63 mesh with the rear and front side gears 54 and 53, respectively.

End washers 65 are disposed between the side gears 53 and 54 and the differential case 52.

When the vehicle runs straight forward, because no rotation speed difference occurs between the front and rear side gears 53, and 54, the pinion gears 60 and 61 do not rotate about their axes and the front and rear side gears 53 and 54 rotate together with the differential case 52.

When a speed difference occurs between the front and rear side gears 53 and 54, the pinion gears 60 and 61 compensate for the speed difference by reversibly rotating with respect to each other.

When a load difference occurs between the front and rear wheels, the front and rear side gears 53 and 54 operate such that a mesh-reacting force is generated between the side gears 53 and 54 and the pinion gears 60 and 61. The mesh-reacting force acts as a thrust force applied to a teeth surface of the helical gear in an axial direction.

Accordingly, the side gears 53 and 54 are forced against the washers 64 and 65, and the pinion gears 60 and 61 are engaged with the differential case 52 by the thrust force. As a result, the side gears 53 and 54 and the pinion gears 60 and 61 are integrally connected to the differential case 52, thereby distributing equal drive torque to front and rear differentials (not shown) to realize limited slip differential operation.

However, in the above-described differential, because the diameters of the front and rear side gears are identical to each other and the pinion gears are meshed with the front and rear side gears in parallel, a friction area between the pinion gears and the inner wall of the differential case is limited, making it difficult to obtain limited slip differential force during a limited slip differential mode.

In addition, it is preferable to differently distribute drive torque to front and rear wheels to meet a balance with respect to the ground contacting force of the front and rear wheels. However, in the conventional center differential, because the distributing ratio of drive torque to the front and rear wheels is fixed at 50:50, it is difficult to enlarge the range of driving capability of the center differential.

SUMMARY OF THE INVENTION

The present invention has been made in an effort to solve the above-described problems.

It is an objective of the present invention to provide a center differential that can provide high limited slip differential force and distribute drive torque to front and rear wheels in accordance with the ground contacting force of the front and rear wheels.

To achieve the above objective, the present invention provides a center differential for a four-wheel drive vehicle, comprising a differential case having a longitudinal axis, front and rear side gears disposed within the differential case in a longitudinal direction, and a plurality of pinion gears engaged with the outer circumferences of the front and rear side gears, wherein each rotating axis of the pinion gears is declined at a predetermined angle with respect to the longitudinal axis of the differential case.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings. The terms "front" and "rear" as used herein shall mean and refer to the respective forward and rearward directions of the vehicle body.

Figure 1:
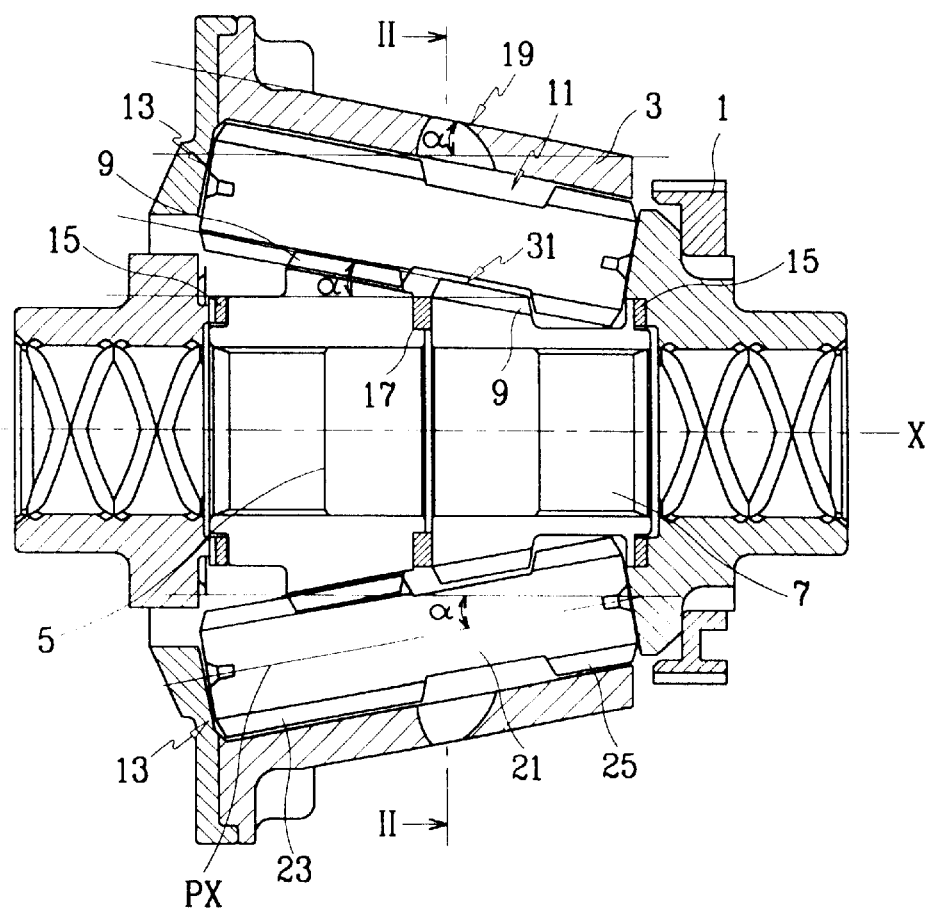
FIG. 1 is a side sectional view of a center differential according to a preferred embodiment of the present invention.
Figure 2:
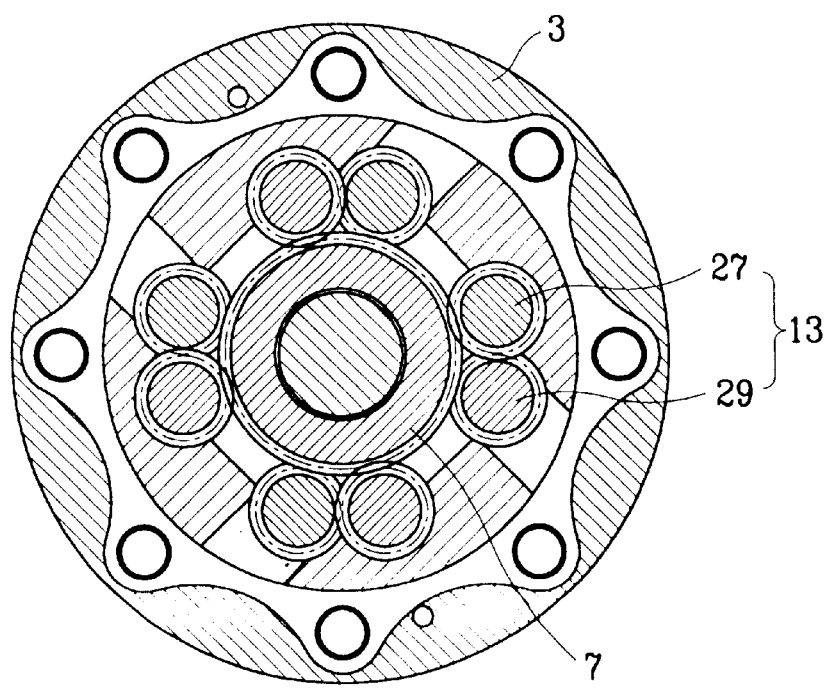
FIG. 2 is a sectional view taken along line II—II of FIG. 1.
Figure 3:
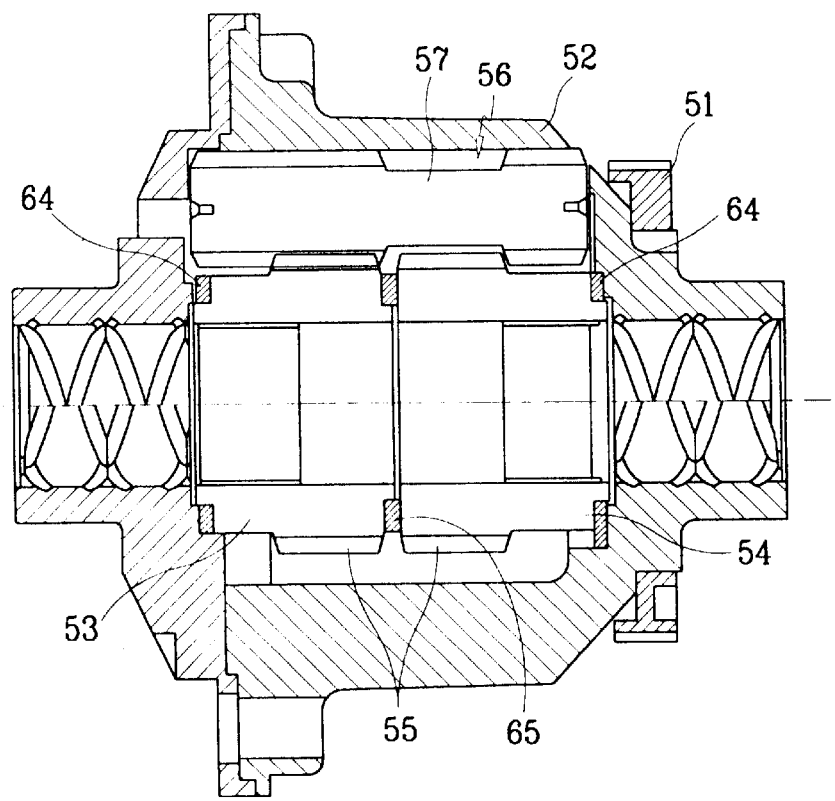
FIG. 3 is a side sectional view of a conventional center differential.
Figure 4:
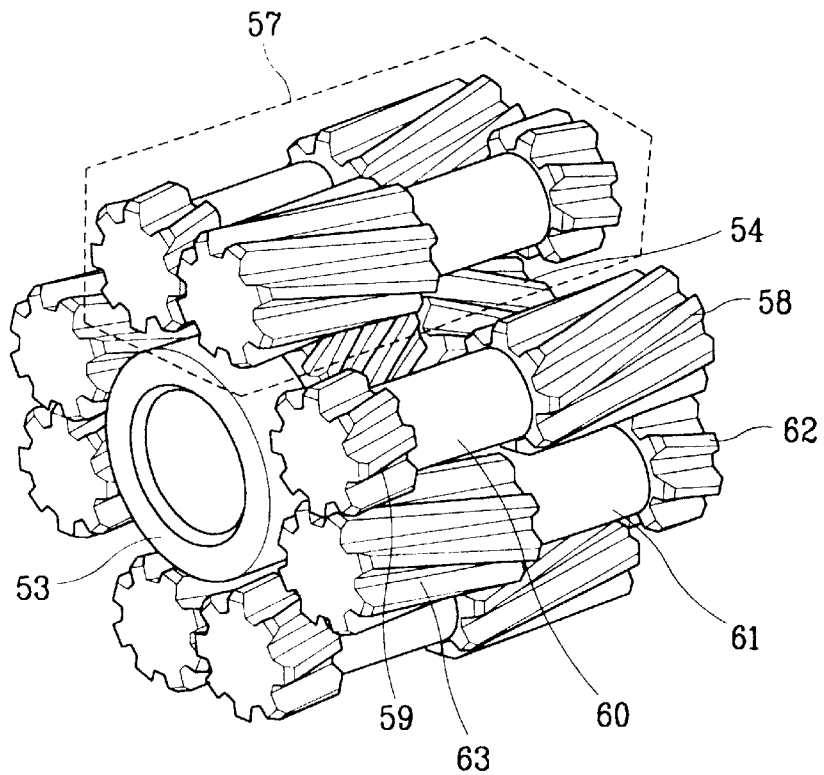
FIG. 4 is a perspective view of a pinion/side gear assembly of a conventional center differential.

FIGS. 1 and 2 show a center differential according to a preferred embodiment of the present invention.

The inventive center differential comprises a differential case 3 having a longitudinal axis X. A ring gear 1 is integrally formed around the differential case 3. Front and rear side gears 5 and 7 are disposed within the differential case 3, with each central axis of the front and rear side gears 5 and 7 being identical to the longitudinal axis X of the differential case 3. The front and rear side gears 5 and 7 are splined to a drive shaft (not shown) and are provided with helical gear teeth 9 at their outer circumferences.

Four sets of pinion gear assemblies 13 each having first and second pinion gears 27 and 29 are disposed within gear grooves 11 formed on an inner wall of the differential case 3 and engaged with the side gears 5 and 7. End washers 15 are interposed between the front side gear 5 and the differential case 3 and between the rear side gear 7 and the differential case 3. A center washer 17 is disposed between the front and rear side gears 5 and 7.

The outer circumference of the differential case 3 is designed to have a predetermined angle α with respect to the central axis X. That is, the diameter of the outer circumference of the differential case 3 increases as it goes frontward.

Accordingly, the gear grooves 11 are also designed to have the predetermined angle α with respect to the central axis X of the differential case 3. As a result, the pinion gears 27 and 29 are inserted into the gear grooves 11 such that each rotating axis PX of the pinion gears 27 and 29 is oriented at a predetermined angle with respect to the central axis X of the differential case 3.

The first pinion gear 27 has long and short helical gears 23 and 25 disposed along a common axis, and the second pinion gear 29 has short and long helical gears 25 and 23 disposed along a common axis. The first and second pinion gears 27 and 29 of each set of pinion gear assemblies 13 are disposed such that the long and short helical gears 23 and 25 of the first pinion gear 27 mesh with the short and long helical gears 25 and 23 of the second pinion gear 29, respectively. In addition, the long helical gears 23 of each pinion gear mesh with the front and rear side gears 5 and 7.

Since the front and rear side gears 5 and 7 should be engaged with the pinion gear sets 13 each of which has a rotating axis located at the predetermined angle α with respect to the central axis X, the diameters of the front and rear side gears 5 and 7 are formed corresponding to the predetermined angle α.

The operation of the above-described center differential will be explained hereinafter.

When the vehicle runs straightforward, since there is no speed difference between the front and rear side gears 5 and 7, each pinion gear does not rotate about its axis, and the front and rear side gears 5 and 7 and the differential case 3 integrally rotate.

At this point, since the diameters of the front and rear side gears 5 and 9 are different from each other, the torque transmitted to a front differential (not shown) through the front side gear 5 becomes different from the torque transmitted to a rear differential (not shown) through the rear side gear 7. This will be described more in detail hereinbelow.

In a differential mode, there is a speed difference between the front and rear side gears 5 and 7. This speed difference is compensated for by the pinion gear sets 13 which rotate in different directions. That is, a rotational speed of the wheels at one end of the vehicle increases the revolving speed of the pinion gear sets 13, and a rotational speed of the wheels at the other end is reduced, thereby realizing the differential operation of a vehicle.

In a limited slip differential mode, the operation of the front and rear side gears 5 and 7 affects them by generating a meshing-reaction force between the side gears 5 and 7 and the pinion gear sets 13. The meshing-reaction force acts as a thrust force in an axial direction with respect to the gear teeth.

Accordingly, the front and rear side gears 5 and 7 generate a frictional force when forced against the washers 15 and 17. The pinion gear sets 13 also generate frictional force while applying pressure to the inner wall of the differential case 3 through the reaction force, thereby integrally connecting the side gears and the pinion gears to the differential case 3 to distribute the torque to the front and rear differentials.

Here, since the pinion gear sets 13 are oriented such that their rotating axis are disposed at the predetermined angle α with respect to the central axis X of the differential case 3, the contact area between the differential case and the pinion gear sets 13 is increased, thereby increasing frictional torque acting in a radial direction so as to improve limited slip differential operation.

In the above described embodiment, the front side gear 5 is designed to have a larger diameter than the rear side gear 7 so that a higher drive torque can be distributed through the front side gear 5. Therefore, when the center differential according to this embodiment is employed with a four wheel drive vehicle having a higher front load, the driving safety of the vehicle can be improved by balancing the ground contacting force of the front and rear wheels through differentiating the drive torque distributed to the front and rear wheels.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A center differential for a four-wheel drive vehicle, comprising:

a differential case having a longitudinal axis and an inner circumference;

front and rear side gears disposed within the differential case in a longitudinal direction; and a plurality of pinion gears engaged with outer circumferences of the front and rear side gears and with the inner circumference of the differential case, wherein the outer circumferences of the front and rear side gears are declined at a predetermined angle greater than 0 degrees with respect to the longitudinal axis of the case; and wherein each rotating axis of the pinion gears is declined at a predetermined angle greater than 0 degrees with respect to the longitudinal axis of the differential case.

2. A differential comprising:

a differential case having a longitudinal axis and an inner surface;

first and second gears disposed within the differential case to rotate about said longitudinal axis and having outer surfaces; and a plurality of pinion gears coupled with the outer surfaces of the first and second gears and engaged with the inner surface of the differential case, each of said pinion gears rotating about an axis;

wherein the outer surfaces of the first and second gears are inclined at a predetermined angle greater than 0 degrees with respect to the longitudinal axis of the case; and wherein each rotating axis of the pinion gears is inclined at a predetermined angle greater than 0 degrees with respect to the longitudinal axis of the differential case.

* * * * *